United States Patent [19]

Takehara

[11] Patent Number: 4,957,151
[45] Date of Patent: Sep. 18, 1990

[54] RADIAL TIRE FOR PASSENGER CARS INCLUDING FOLDED BAND LAYER AT THE BELT EDGES

[75] Inventor: Kenji Takehara, Kobe, Japan

[73] Assignee: Sumitomo Rubber Industries, Ltd., Hyogo, Japan

[21] Appl. No.: 207,964

[22] Filed: Jun. 17, 1988

[30] Foreign Application Priority Data

Jun. 17, 1987 [JP] Japan .................. 62-152321

[51] Int. Cl.$^5$ .................. B60C 3/00; B60C 9/28
[52] U.S. Cl. .................. 152/454; 152/529; 152/536; 152/538
[58] Field of Search .............. 152/526, 528, 529, 531, 152/534, 535, 536, 538, 454

[56] References Cited

U.S. PATENT DOCUMENTS

| 3,985,173 | 10/1976 | Masson | 152/529 |
| 4,184,529 | 1/1980 | Boileau | 152/529 |
| 4,815,511 | 3/1989 | Brayer et al. | 152/454 X |

FOREIGN PATENT DOCUMENTS 61005 4/1983 Japan .................. 152/535

Primary Examiner—Michael W. Ball
Assistant Examiner—Geoffrey L. Knable
Attorney, Agent, or Firm—Birch, Stewart, Kolasch & Birch

[57] ABSTRACT

A radial tire for passenger cars, comprising: a pair of bead cores; a radial carcass ply, the edges of which are turned up around bead cores; a tread; a belt layer composed of at least two plies of steel cords; and band layers folded over at the edges of the belt layer to form an upper layer portion radially outside the belt layer and a lower layer portion radially inside the belt layer, wherein the band layers are composed of organic fiber cords inclined by 5 to 45 degrees to the circumferential direction of the tire. A gap distance G1 between the upper layer portions of the band layers is in a range of 35 to 65% of the width WB of the belt layer, and the width W2 of the lower layer portion is longer than the width W1 of the upper layer portion and their difference W2−W1 is in a range from 5 to 20 mm. Preferably, the surface of the tread, when the tire is inflated to 5% of the standard internal pressure, is composed of a pair of external arc portions with a radius of curvature (TR2) and an internal arc portion therebetween with a radius of curvature (TR1), and the ratio (TR2/TR1) thereof is in a range from 0.15 to 0.45 and furthermore each of the intersections P thereof is located between the axially inner edge of the lower layer portion and the axially outer edge of a duplicated portion in which the at least two steel cord plies of the belt layer duplicate with each other.

2 Claims, 3 Drawing Sheets

RADIAL TIRE FOR PASSENGER CARS INCLUDING FOLDED BAND LAYER AT THE BELT EDGES

BACKGROUND OF THE INVENTION

The present invention relates to a radial tire for passenger cars having an improved durability at high speed, and high-speed steerability.

As freeway networks have increased and passenger cars have been designed to travel at high speed, tires for passenger cars should be improved in their performances in conditions of running at high speed, especially high-speed durability and high-speed steerability.

As a tire suitable for high speed driving, radial tires are widely used in which carcass cords are arranged in the radial direction and a belt layer of steel cords is effectively disposed in the tire. In such a radial tire, both ends of the belt layer are sometimes lifted and separated from the surrounding rubber due to the centrifugal force accompanying the rotation of the tire especially in high-speed driving. In particular, in the case of using a cut-end ply composed of steel cords as the belt layer, separation from the rubber is promoted together with an insufficient adhesion, and as a result the high-speed durability of the tire is lowered.

The high-speed steerability can be improved by enhancing the stiffness of the tire especially at the shoulder portion.

With the purpose of such improvements, a radial tire, for example as shown in FIG. 3, provided on each edge of a belt layer A with a narrow band layer B composed of organic fiber cords, for covering the belt layer A was proposed in Japanese Patent KOKAI No. 58-61004.

Another example, as shown in FIG. 4, providing a band layer B on the belt layer A for covering the edges there of was proposed by Japanese Patent TOKKYO KOHO No. 44-19561, and still another example in a similar constructions was offered in Japanese Unexamined Utility Model KOKAI No. 60-52503.

However, in a tire proposed in the Japanese Patent KOKAI No. 58-61004, although the movement of the belt layer A can be inhibited and the separation of the belt can be prevented to a certain degree by covering the edge of the belt layer A by the band layers B, the plurality of belt plies forming the belt layer A can be freely move relative to each other, so that the object cannot be fully achieved.

In the tires of Japanese TOKKYO KOHO No. 44-19561, shown in FIG. 4 and Japanese Unexamined Utility Model KOKAI No.62-52503, by covering the edges of the belt layer A by the band layers B, the separations of the rubber at the edges of the belt layer A can be more efficiently prevented and the high-speed durability can be enhanced in comparison with the tire shown in FIG. 3.

However, in the Japanese Patent KOKAI No. 44-19561, the folded edges of the band layer B are arranged on a plane at right angles to the tire axis which causes a drastic stiffness difference of the belt layer A on the portion of the tire and it induces uneven ground contact pressure and becomes a cause for uneven wear. Moreover, the steerability is sometimes impaired.

In the example of Japanese Unexamined Utility Model kOKAI No. 62-52503, it is proposed to arrange the cords of the band layers B parallel to the circumferential direction of the tire. It becomes apparent that in such a tire having the cords of the band layers B arranged parallel to the circumferential direction of the tire, the stiffness in the shoulder portion tends to rise excessively to cause a lack of balance and thus the steerability of the vehicle at high speed is lowered.

SUMMARY OF THE INVENTION

As described above, in a radial tire for passenger cars, it is important to set the width and the positions of the edges of the band layers B as well as arranging the method so as to maintain good balance to simultaneously satisfy the requirements of high-speed durability and steerability at high speed, and furthermore, the inclination of the cords of the band layers should be considered for improving these performances.

The present invention has been developed on a radial tire for passenger cars, to increase the durability and steerability in a high-speed driving, after studying the various conditions of the band layers, and hence it is a primary object of the present invention to provide a radial tire simultaneously satisfying these performance criteria.

It is another object of the present invention to provide a radial tire for passenger cars in which uneven wear can be prevented and the life of the tire can be extended while improving the durability and steerability of the tire at high speed by unifying the ground contact pressure on the tread surface during vehicle operation.

According to one aspect of the present invention, a radial tire for passenger cars has a tread portion, sidewall portions extended from both ends of the tread portion inward in the radial direction, and bead portions located at both ends in the radial direction of the sidewall portions. The tire comprises a toroidal carcass which is formed by folding over both ends of cords passing through the tread portion and sidewall portions and extending almost parallel to the radial direction of the tire around bead cores in the bead portions, a belt layer composed of at least two plies of steel cords located adjacent to the carcass outside the carcass in the radial direction and band layers located at the side edges of the belt layer and each layer being folded over at the edges of the belt layer to form an upper layer portion outside the belt layer and a lower layer portion inside the belt layer, wherein the band layers are composed of organic fiber cords inclined by 5 to 45 degrees with respect to the circumferential direction of the tire, the upper layer portions are separated from each other by a gap distance and the lower layer portions are separated from each other by a gap distance, the gap distance G1 between the upper layer portions is in a range of 35 to 65% of the width WB of the belt layer, and the width W2 of the lower layer portion is longer than the width W1 of the upper layer portion and their difference W2−W1 is in a range from 5 to 20 mm.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
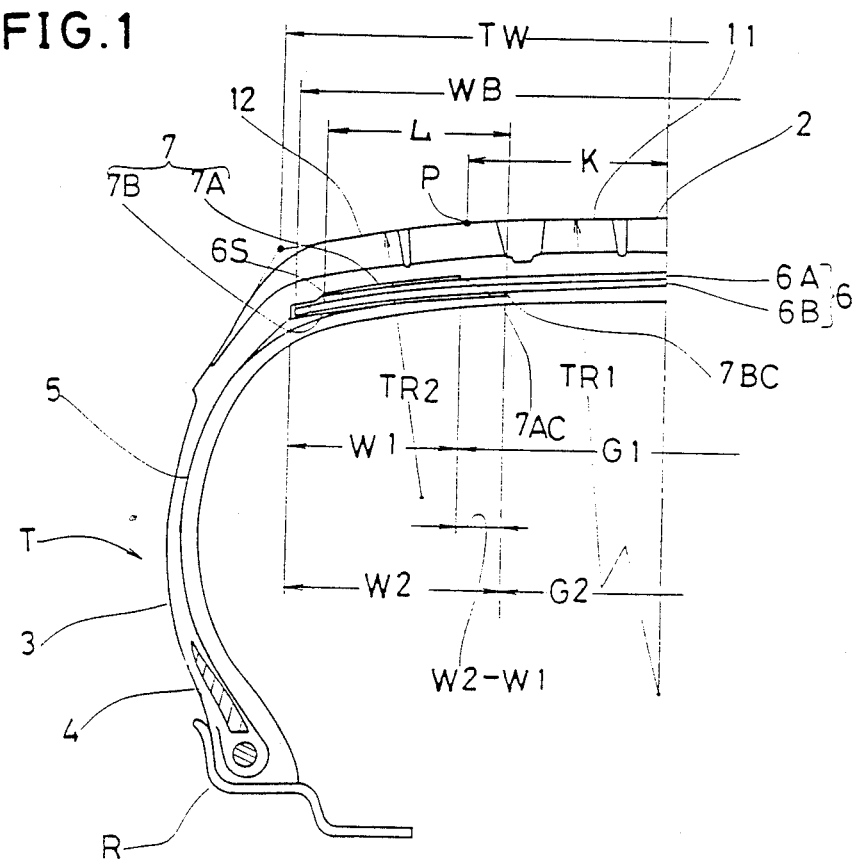
FIG. 1 is a sectional view showing an embodiment of the present invention.

An embodiment of the present invention is now explained in detail referring to the attached drawings.

In the drawing (FIGS. 1 and 2), tire T has a sidewall portion 3 extending from each end of a tread portion 2 inward in the radial direction, and a bead portion 4 located at the end of the sidewall portion 3 inside in the radial direction, and further comprises a toroidal carcass composed of cords extending almost parallel to the radial direction of the tire and of which each end is folded over around each bead core, and a belt layer 6 arranged outside the carcass 5 in the radial direction. A band layer 7 is located on each end of the belt layer 6 so as to cover each end of the belt layer 6.

The expression that the carcass cords extend almost parallel to the radial direction means that they extend at an angle not more than 10 degrees, inclusive of both so-called radial tires and semiradial tires.

The above-mentioned belt layer 6 is, in this embodiment, composed of two steel cord upper and lower plies 6A, 6B, using steel cords, and the lower ply 6B is designed to have wider width than the upper ply 6A and the plies 6A and 6B have a cut-end structure where the side edges are cut. The cord angles are in a range of 10 to 30 degrees, more preferably in a range of 15 to 23 degrees with regard to the circumferential direction of the tire and the upper and lower plies 6A, 6B are inclined in opposite directions. The reason why the plies having a cut-end structure are used is that, since the steel cords have a high stiffness, when a so-called fold structure is employed, the stiffness at the folded-over edges becomes extremely high, so that the stresses tend to be concentrated to cause separation of the plies from the rubber surrounding the difference in stiffness between the folded edges into two layers and the central portion with one layer is not conducive in obtaining a specified distribution in the ground contact pressures. On the contrary, by employing a cut-end structure, since it is constructed by a single layer, the extreme concentration of stresses as experienced in the known structures might not occur.

Here, the plies 6A, 6B of the belt layer 6 may have the same width or be provided in different widths with a step. In such a case, the upper ply 6A may be made wider.

Secondly, the above-mentioned band layers are composed of organic fiber cords made of nylon, polyester, aromatic polyamide or the like. The band layers are located on the side edges of the belt layer 6, each of which is folded over at each edge to form an upper layer portion 7A disposed outside the belt layer 6 and a lower layer portion 7B disposed in side the belt layer 6.

The organic fiber cords forming the band layer 7 are inclined with regard to the circumferential direction of the tire by 5 to 45 degrees, more preferably by 10 to 30 degrees. If the inclining angle is less than 5 degrees, the stiffness at the tread shoulder portion is heightened excessively by the band layer 7 and the balance of stiffness at the tread tends to be lost. Additionally, it becomes difficult to mount the band layer in the process of manufacturing. In contrast, when the angle exceeds 45 degrees, the stiffness cannot be raised effectively and the steering performaces cannot be enhanced.

In the radial tire T for passenger cars of the present invention, the gap G1 between the edges 7AC on the crown side, that is, the axially inner edge, of the upper layers 7A is set in a range of 35 to 65% of the width WB of the belt layer 6. If the rate exceeds 65%, the gap G1 becomes very large which causes an insufficient reinforcing effect by the band layer 7 and an inferior effect in preventing the lifing of the belt layer edges. When the rate is smaller than 35%, however, the stiffness at the crown portion as well as the shoulder portion rises excessively, so that uniformed ground contact pressure at the tread surface is impaired. The width of the belt layer 6 is, meanwhile, defined as the width of the widest belt ply, for example, in this embodiment, the width of the lower steel ply 6B.

The width W2 of the lower layer portion 7B is, furthermore, set longer the width W1 of the upper layer 7A, and the difference therebetween W2−W1 is set at an amount of 5 to 20 mm. When the difference W2−W1 is less than 5 mm, the edges 7AC, 7BC of the upper layer piece 7A and the lower layer piece 7B on the crown sides approach each other which generates rapid change of the stiffness on the belt layer 6, so that the curvature at this portion varies when inflated to the standard internal pressure. As a result, the ground contact pressure becomes uneven, uneven wear occurs and the steering performance is spoiled. Such an effect can be obtained at a limit of 20 mm, so that it is unnecessary to make it longer than that, and moreover, when the difference exceeds 20 mm, the lower layer piece 7B extends up to the point beneath the crown side, the rubber gauge at the crown portion increases and the tire weight becomes heavy.

The tire T of the present invention has, as described above, a gap G1 between the edges 7AC of the upper layer portions on the crown side, and also a gap G2 formed between the edges 7BC of the lower layer pieces 7B, so as to smoothly change the stiffness from the crown portion to the shoulder portion where the stiffness is large, together with the effect of the difference W2−W1.

The tire T is assembled in a specified rim R for the tire. When an internal pressure which is 5% of the standard internal pressure for the tire, that is, a 5% internal pressure is applied, the tread surface is composed of an internal arc portion 11 which forms the crown portion, and an external arc portions 12 which forms the shoulder portions. The internal arc portion 11 is formed by an arc surface with the radius of curvature TR1 having the center on the equatorial plane C. The external arc portion 12 has a radius of curvature TR2.

The internal arc portion 11 and the external arc portions 12, accordingly, have a pair of lines of intersection on the tread surface.

In this tire T, when inflated to the 5% internal pressure, the ratio TR2/TR1 of the radii of curvature TR1 and TR2 is set in a range of from 15 to 45%, more preferably from 20 to 35%.

The stiffness of the shoulder portion is enhanced by the fact that the band layer 7 is located at the ends of the belt layer 6. Accordingly, when inflated to a normal pressure, the bulge-out at the shoulder portion, that is, the external arc portion 12 can be inhibited, and as a result, that of the crown portion, that is, the internal arc portion 11 becomes relatively large, and the radius of curvature TR1 of this portion is reduced, so that distribution of the ground contact pressure of the tread surface tends to be uneven.

For this reason, the ratio TR2/TR1 of the radii of curvature is set, in this embodiment, in the above-mentioned range, and the radius of curvature TR1 at the internal arc portion 11 when inflated to 5% internal pressure is preliminarily made large within the range so as to make the shape of the tread surface at normal pressure appropriate, so that the distribution of the ground contact pressure is made even. Such a function is effectively executed in a low aspect ratio tire.

Here, the intersection P of the internal arc portion 11 with the external arc portion 12, of which distance from the equator C of the tire is indicted by K, is located, in the widthwise direction of the tire, in a range L between the axially inner edge 7BC of the lower layer piece 7B on the crown side and the axially outer edge 6 on the shoulder side of the duplicated area where the steel plies 6A, 6B duplicate each other.

When set in such a manner, each intersection P is placed in the range L where the stiffness is relatively high, so that excessive change of curvature at the intersections P can be prevented even if the internal pressure is applied, and as a result, the shape of the tread surface can be maintained smooth, which helps to unify the ground contact pressure.

Figure 2:
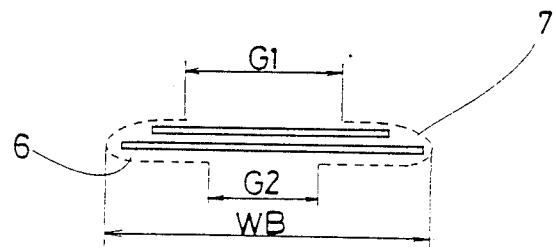
FIG. 2 is sketch showing the belt layer and band layer removed from the tire of FIG. 1.
Figure 3:
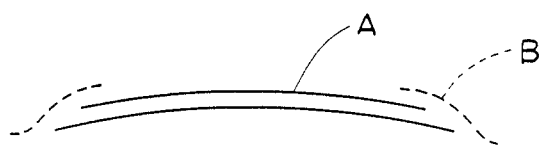
FIGS. 3 and 4 are sketches showing conventional belt and band layers.
Figure 4:
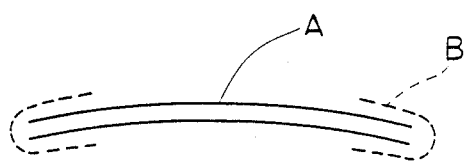

Tires having a structure shown in FIG. 1 were produced as embodiments 1 to 5 in the sizes and specifications shown in Table 1. On the other hand, tires in the sizes shown in the columns of comparative examples 1, 2 in Table 1 were also fabricated and high-speed durability and high-speed steerability were compared with those of the embodiments. The shapes of ground contact surface were also measured. In these tires, steel plies inclining by 19 degrees were used, and in the embodiments, 66 nylon reinforcing layers (1260d/2) were employed as band layers. Comparative example 1 has a structure shown in FIG. 3 in which two 66-nylon reinforcing layers (1260d/2) crossed each other were used as each band layer, and comparative example 2 has no band layer. The inclination of the band layers with regard to the circuferential direction is 22 degrees.

The durability of these tires was examined by a stepped speed test using ECE30.

Loosenings at the edge of the belt layer 6 were observed and the tires were broken at a stage of 240 km/h in comparative example 1 and 210 km/h in comparative example 2. On the contrary, all of the embodiments 1 to 5 reached the end of the test without being broken up to 240 km/h.

Tires of embodiment 3, comparative examples 1 and 2 were mounted on front drive passenger cars of 1600 cc and their steerability was measured by a feeling test. The results were: preferable feeling could be obtained in the order of embodiment 3, comparative example 1 and comparative example 2. This test was performed by driving on a flat road surface at a speed of 80 km/h while negotiating curves.

The wearing performace was also examined by using actual cars, and such a result could be obtained that the tread surface wore evenly in embodiments in comparison with comparative examples 1, 2.

Figure 5:
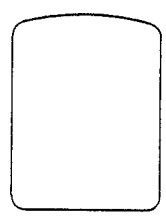
FIG. 5 is a sketch the ground contact shape of the tire of the present invention.
Figure 6:
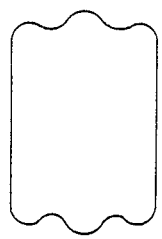
FIGS. 6 and 7 are the sketches showing the ground contact shape those of the tires of comparative examples.
Figure 7:
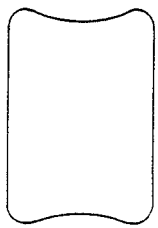

As seen from the sketches of the shapes of the ground contact surface in FIG. 5 in the case of embodiment 3, in FIG. 6 in the case of comparative example 1, and in FIG. 7, comparative example 2, it can be considered that the tires of the embodiments of the present invention have preferable ground contact shapes and also the distribution of the ground contact pressures is uniform.

The radial tire for passenger cars as defined by the present invention is produced according to the method and dimensions of the band layers covering the edges of the belt layer as described above, and hence the high-speed steerability as well as high-speed durability can be enhanced.

TABLE 1

| | | | | | | | | | | | Length unit: mm |
|---|---|---|---|---|---|---|---|---|---|---|---|
| | TIRE SIZE | TW | WB | G1 | G2 | W2-W1 | G1/WB | K | TR1 | TR2 | TR2/TR1 |
| Embodiment 1 | 215/60R15 | 180 | 180 | 100 | 60 | 20 | 0.56 | 49 | 940 | 205 | 0.218 |
| 2 | 205/60R15 | 172 | 172 | 102 | 72 | 15 | 0.59 | 47 | 900 | 195 | 0.217 |
| 3 | 195/60R14 | 164 | 164 | 94 | 74 | 10 | 0.57 | 45 | 860 | 185 | 0.215 |
| 4 | 185/60R14 | 156 | 156 | 86 | 66 | 10 | 0.55 | 43 | 820 | 175 | 0.213 |
| 5 | 175/60R14 | 148 | 148 | 88 | 78 | 5 | 0.59 | 40 | 780 | 165 | 0.211 |
| Comp. Ex. 1 | 195/60R14 | 164 | 164 | | | | | | 450 | 450 | 1.00 |
| 2 | 195/60R14 | 164 | 164 | | | | | | 450 | 450 | 1.00 |

I claim:

1. A radial tire for passenger cars comprising:
   a bead core disposed in each bead portion of the tire;
   a carcass having a ply of radially arranged cords both ends of which are turned up around the bead cores;
   a tread disposed on the carcass;
   a belt layer having two plies of steel cords disposed between the carcass and the tread; and
   a band layer disposed at each edge of the belt layer and turned back on itself to form an upper portion disposed radially outside the belt layer and a lower part disposed radially inside the belt layer, said band layers being composed of organic fiber cords inclined at 5 to 45 degrees to the circumferential direction of the tire,
   the band layers being axially separated from each other between the upper portion and the lower portion, and the gap between the upper portion being in a range of 35 to 65% of the width of the belt layer,
   the width of the lower portion of each band layer being 5 to 20 mm larger than the width of the upper portion thereof,
   the tread, in a state that the tire is mounted on a regular rim and inflated to 5% of a regular internal pressure, provided with a tread face composed of a central arc portion with a radius of curvature (TR1) and a pair of lateral arc portions with a radius of curvature (TR2) located one on each side of the central arc portion,
   the ratio (TR2/TR1) of the radius of curvature (TR2) of the lateral arc portions to the radius of curvature (TR1) of the central arc portion being in a range of 0.15 to 0.45, and a connection between the internal arc portion and each external arc portion located axially outward of the axially inner edge of the lower part of each band layer and axially inward of each edge of the overlap of the two belt plies.

2. The tire as set forth in claim 1, wherein said two belt plies are inclined in opposite directions with respect to the circumferential direction of the tire at cord angles of 10 to 30 degrees.

* * * * *